3,052,654
STABILIZED POLYPYRROLIDONE
Paul I. Roth and Allan R. Shultz, White Bear Lake, Minn., assignors to Minnesota Mining and Manufacturing Company, St. Paul, Minn., a corporation of Delaware
No Drawing. Filed Nov. 8, 1957, Ser. No. 695,212
2 Claims. (Cl. 260—78)

This invention relates to the stabilization of polymer systems and more particularly to a process for the stabilization of polypyrrolidone toward thermal molecular weight degradation and to the stabilized polypyrrolidone thus produced.

The synthetic linear polyamide resin prepared by polymerizing pyrrolidone is a useful substance which posseses physical properties that render its application in various areas highly advantageous. Thus, for example, the polymer has a tendency to absorb an amount of water, and when produced in the form of fibers, the cloth woven from such fibers is readily dyed and has desirable physical properties. The preparation and the use of the polymers of the invention are disclosed in U.S. Patent 2,638,463.

It has heretofore been found that pyrrolidone can be polymerized in bulk to a solid, polypyrrolidone, of high inherent viscosity. The material which is thus produced is a hard thermoplastic substance having a moderately high melting point. When heated in air without removing degradation products therefrom, the melting point of polypyrrolidone is about 260° C., because the pyrrolidone monomer which is produced during heating tends to dissolve the polymer, thereby depressing the melting point. When heated with removal of degradation products, the melting point of polypyrrolidone is upwards of 280° C. Such solid polypyrrolidone can be reduced to a powder which may be molded to form objects of various shapes. However, a serious drawback has heretofore existed in the polypyrrolidone known and used for these purposes. It has been found that during the process of molding of polypyrrolidone, the substance undergoes thermal degradation whereby the average molecular weight is progressively reduced. At the same time, and as a result thereof, the inherent viscosity as well as the melt viscosity of the polymer rapidly decrease, and the decrease in inherent viscosity is a measure of the change in average molecular weight. Apparently, substantially the only product of the degradation is pyrrolidone, which commonly escapes from the solid polymer in the form of vapor at elevated temperatures. The presence of the vapor and the change in melt viscosity produces irregularities in the fabricated articles, even to the extent of producing voids or bubbles therein. If melt spinning or extrusion of the polymer is attempted, such discontinuities are obviously marked disadvantages and may undesirably affect the use of such fabrication processes. Furthermore, the rate of degradation and consequent change in inherent viscosity may vary; or, fresh material which has high inherent viscosity may come into a heated zone, whereby fluctuations in the physical state of the material being worked may occur. Such fluctuations can make control of the pressure employed, the size of the extruded article or the rate of extension and the like a formidable obstacle to continuous and economical production.

It is an object of this invention to provide a process whereby polypyrrolidone is stabilized against change in viscosity and average molecular weight upon heating. It is a further object of this invention to provide a stabilized polypyrrolidone, which is suitable for extrusion techniques. It is still another object of the invention to provide polypyrrolidone which is especially adapted for melt spinning. Other objects of the invention will become apparent from the disclosure hereinafter made.

In accordance with the above and other objects of the invention, it has been found that polypyrrolidone can be stabilized toward change in inherent viscosity by heating it at a temperature in the range of from about 200° to 270° C. for a period of about 5 to 60 minutes, and removing the monomer thereby produced from the polymer. The temperature and the time of heating are interdependent; i.e., when temperatures in the upper part of this range are employed, shorter heating times are required, while lower temperatures in the range set forth will require somewhat longer periods of heating within the time range set forth. During the heating period, there is a rapid lowering of the inherent viscosity of the polymer to a substantially stable point, accompanied by a loss in weight which is ordinarily less than about 10 percent of the original amount of polypyrrolidone which is present. The inherent viscosity of the remaining polypyrrolidone remains substantially constant upon reheating to that temperature. Preferably, the temperature selected for use in the process is of the order of that at which further processing or fabrication of the polypyrrolidone is to be carried out, but below the melting point. In this instance the melting point referred to is the melting point of the polypyrrolidone determined by heating while removing degradation products therefrom. Preferably, the polypyrrolidone is heated at a temperature and for a period of time in the range stated until its inherent viscosity is brought to a point in the range of about 1.8 to 1.4 deciliters per gram when determined by the method hereinafter set forth. The treated polypyrrolidone is readily molded to form uniform, void-free structures and extruded or melt-spun to form monofilaments.

Broadly speaking, the process of the invention is conveniently carried out by placing the polypyrrolidone to be stabilized in a suitable container or kettle lined with glass or other unreactive material. The contents of the container are then brought to a temperature in the specified range as quickly as possible, with precautions to assure that there is no local over-heating. Preferably, the material being treated is kept under an inert atmosphere or under vacuum. After a temperature in the desired range has been attained, the charge in the kettle is maintained in that range for a period of from about 5 minutes to about one hour. The pyrrolidone which is formed in the process is continuously removed and thus sintering of the polymer to a solid or semi-solid mass owing to partial solution of the polymer in the monomer during treatment is avoided. The inherent viscosity falls relatively rapidly until a substantially constant value is reached. Heating is then discontinued, the kettle is allowed to cool and the contents are removed, packed in storage containers and set aside for use. Further heating at the same or a lower temperature of the stabilized polypyrrolidone of the process of the invention produces no marked change in inherent viscosity. Thus, there is produced polypyrrolidone having a stabilized low rate of thermal molecular weight degradation.

The improved polypyrrolidone of the invention can be converted into any desired form, such as fibers, yarns, tire cord, fabric, molded articles, films, monofilaments, extruded articles and the like. The physical properties of the polymer suffer no adverse effects from the thermal stabilization process. For example, fibers produced employing the viscosity-stable polypyrrolidone of the inventions have excellent strength and good dyeability and they also possess the ability to absorb an amount of water, thus approximating the properties of certain natural fibers in this respect.

The following examples will illustrate the process for stabilization of polypyrrolidone against viscosity changes and the stabilized polymer thus produced. In the examples, all parts are by weight and the measurements of inherent viscosity, expressed in deciliters per gram, are made according to a standard method, using an Ostwald viscometer as the measuring means for a solution of the polypyrrolidone in concentration of 0.2 percent in meta-cresol. The inherent viscosity value thus determined is a direct function of the melt viscosity. The method is described in Textbook of Polymer Chemistry, F. W. Billmeyer, Jr., Interscience Publishers, New York, 1957 chapter 14.

EXAMPLE 1

A vacuum kettle provided with an electrical heating jacket and means for condensing the vapors which are withdrawn therefrom is charged with 50 parts of coarsely ground polypyrrolidone having an inherent viscosity of about 2.8 and melting at about 280° C. The temperature of the kettle is rapidly raised to 250° C., with agitation by means of an anchor type stirrer. The vessel is at the same time maintained at a pressure of about 2 mm. of mercury. The granular polypyrrolidone remains in this condition during the process. The pyrrolidone which is produced during the heating is collected in a receiver maintained at about 0° C. Heating is continued at 250° C. for 10 minutes, then discontinued and the kettle is opened and the contents allowed to cool. It is found that the polypyrrolidone remaining in the kettle has an inherent viscosity of about 1.7 which is reduced only very slowly by further heating. While it is found that a weight loss of about 10 percent of the original amount of polypyrrolidone has occurred, that is, about 5 parts of pyrrolidone are recovered, the remaining polymer has not been discolored and in every way appears to be identical with the original material, save for the inherent viscosity.

When employed for molding plastic articles, the polypyrrolidone thus produced and thermally stabilized is characterized by its ease in extrusion into the mold, and its smooth void-free appearance and freedom from surface defects when molded.

EXAMPLE 2

An open kettle fitted with means for electrical heating and for rapid cooling is charged with 50 parts of polypyrrolidone, as large chunks. The temperature is raised to about 270° C. and is maintained there, with stirring of the charge, the vapors of the pyrrolidone which are given off from the surface of the melt being conducted off through an exhaust hood, for about 5 minutes. Thereafter, the contents of the kettle are rapidly cooled. It is found that the inherent viscosity has dropped from about 2.8 to about 1.6 during the heating period and that further heating produces only a slight further drop in the inherent viscosity. It is found that the melt has suffered a loss of about 12 percent of its original weight.

EXAMPLE 3

This example serves to show how the reduction in inherent viscosity is related to the temperature at which stabilization is effected as well as the rate of decrease in weight of polymer at the same temperatures. Each of eight samples of granular polypyrrolidone having an inherent viscosity of 2.84 was heated for 60 minutes at temperatures ranging from 115° to 250° C. as given in Table I. The percent loss of weight, i.e. the percentage rate per hour decrease in weight, and the final inherent viscosity are tabulated.

Table I

| Temperature, ° C. | Percent Weight Loss | Final Inherent Viscosity |
|---|---|---|
| 115 | <1 | 2.75 |
| 170 | <1 | 2.45 |
| 180 | 1.2 | 2.28 |
| 200 | 1.4 | 1.65 |
| 210 | 2.5 | 1.47 |
| 220 | 3.1 | 1.18 |
| 230 | 6.5 | 1.03 |
| 250 | 25.8 | 0.77 |

It will be apparent from the above data that it is preferable to heat polypyrrolidone for periods as long as an hour at temperatures below about 220° to 230° since polymers having inherent viscosities below about 1.0 are generally considered less desirable. At temperatures much above 250° heating for as long as an hour results in complete degradation to pyrrolidone and volatilization. It is further evident that heating at temperatures of about 100° to 170° can be carried on for longer periods than an hour without greatly affecting the inherent viscosity. It is apparent that the initial inherent viscosity of the polymer must also be considered in selecting the conditions for thermal stabilization. If the initial inherent viscosity is below about 2.0, either very short times, i.e. less than 5 minutes, will be required at temperatures of the order of 230° to 270° C., or longer periods at a lower temperature such as about 200° C. It will further be apparent that if polypyrrolidone of higher initial inherent viscosity, for example, 3.5 or above, is employed, the stabilization can be effected at a relatively higher inherent viscosity, say about 2 to 2.5, then if polymer of lower initial inherent viscosity is used. It will likewise be apparent that for different purposes, the final inherent viscosity desired may vary, depending on the application, from less than 1 to 2 or above.

A further advantage of the process is the removal of traces of water which, as hereinabove noted, is absorbed by polypyrrolidone. While water appears to have no deleterious action on the polymer and does not accelerate degradation of polymer stabilized by this process, traces of water can give rise to imperfections in fabricated polymer articles and are therefore objectionable, and their removal during the stabilization is a further safeguard of the quality of fabricated products.

Variations in the process will be readily apparent. For example, the stabilization can be effected in two or more successive heating steps at different temperatures for different times. Thus, after heating for a period at 200° C. final stabilization can be achieved by further heating for a short time to 250° C.

It is preferred that stabilization be carried out under low partial pressure of oxygen, preferably less than about 15 mm. of oxygen partial pressure. Such partial pressures can be obtained by conventional methods, such as exhaustive flushing or sweeping out the container with an inert gas, operating under high vacuum or the like. By maintaining the oxygen partial pressure low there is less tendency for discoloring of the polymer during stabilization, an effect which is usually slightly enhanced at the higher temperatures. It will thus be apparent that while stabilization can be effected under atmospheric conditions without special precautions, the vapors of polypyrrolidone then serving to reduce the oxygen partial pressure, when a pure white stabilized polypyrrolidone is desired, every precaution should be exerted as herein described.

As hereinabove pointed out dwell-time, by which is meant the time of exposure to an elevated temperature, is markedly less at temperatures from about 230 to 270°. Because of this it is particularly necessary that local hot spotting be avoided. By this is meant the overheating of small portions of the charge to temperatures above that desired to achieve the inherent viscosity and stabilization desired. Hot-spotting also tends to cause greater discoloring when the oxygen partial pressure is not well below the upper limits. In the above examples stirring with anchor type stirrers was employed to prevent hot-spotting but it will be apparent that other methods are equally applicable. For example, the heating may be effected in a tumbling autoclave or a rotating autoclave so arranged that the temperature and dwell-time are controllable. Such procedures are particularly advantageous for continuous production of stabilized polypyrrolidone on a tonnage basis when batch operation is less economical.

When convenient, glass-lined equipment is preferred for use in the process since traces of metals are often objectionable impurities which impart color and often catalyze oxidative degradation; however, any metal may be employed for construction of the equipment used which is not subject to attack under the operating conditions and which has suitable mechanical properties.

It is to be understood that all these variations and others which will be apparent on reading this description are encompassed within this invention which is only limited by the hereunder attached claims.

Having thus described the invention, what is claimed is:

1. The process for producing polypyrrolidone with improved thermal stability from polypyrrolidone formed in the alkali-catalyzed polymerization of pyrrolidone monomer, which comprises heating thus produced, granulated, catalyst-free polypyrrolidone of initial inherent viscosity of the order of at least about 2, without fusion at a temperature in the range of about 200° to 270° C., for a period of time in the range of about 5 to 60 minutes, with the evolution of pyrrolidone monomer, until the inherent viscosity of the polymer has been reduced to a preselected value above about 1 and lower than the initial value thereof; the higher temperatures being used for the shorter times and the lower temperatures being used for the longer times; while withdrawing vapors present in the gaseous phase and maintaining the partial pressure of oxygen in the gaseous phase below about 15 millimeters of mercury whereby polypyrrolidone having improved stability of molecular weight with respect to subsequent heating to a temperature within the same range and of substantially the original color is obtained in granular form.

2. The process according to claim 1 wherein the total pressure including the partial pressure of oxygen is maintained below about 5 millimeters of mercury.

References Cited in the file of this patent

UNITED STATES PATENTS

| | | |
|---|---|---|
| 2,638,463 | Ney et al. | May 12, 1953 |
| 2,731,081 | Mayner | Jan. 17, 1956 |
| 2,739,959 | Ney et al. | Mar. 27, 1956 |
| 2,806,841 | Barnes | Sept. 17, 1957 |
| 2,806,856 | Robinson | Sept. 17, 1957 |
| 2,809,958 | Barnes | Oct. 15, 1957 |

FOREIGN PATENTS

| | | |
|---|---|---|
| 205,015 | Australia | Jan. 31, 1957 |
| 676,585 | Great Britain | July 30, 1952 |

OTHER REFERENCES

Achhammer et al.: J. Applied Chemistry, London, vol. 1, pages 301–320. Copy in Scientific Library, 1951.